Oct. 16, 1956     S. A. LOUKOMSKY     2,767,103
METHOD AND APPARATUS FOR TREATMENT OF POLYETHYLENE
Filed April 30, 1954
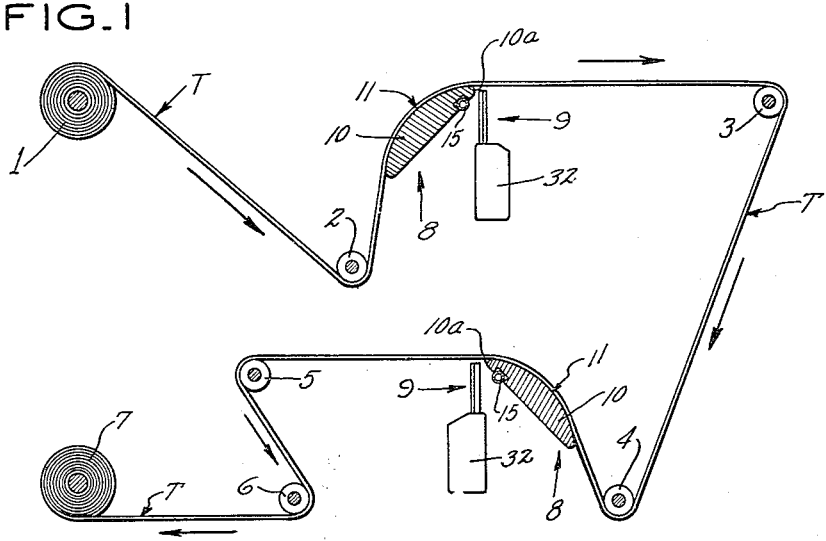
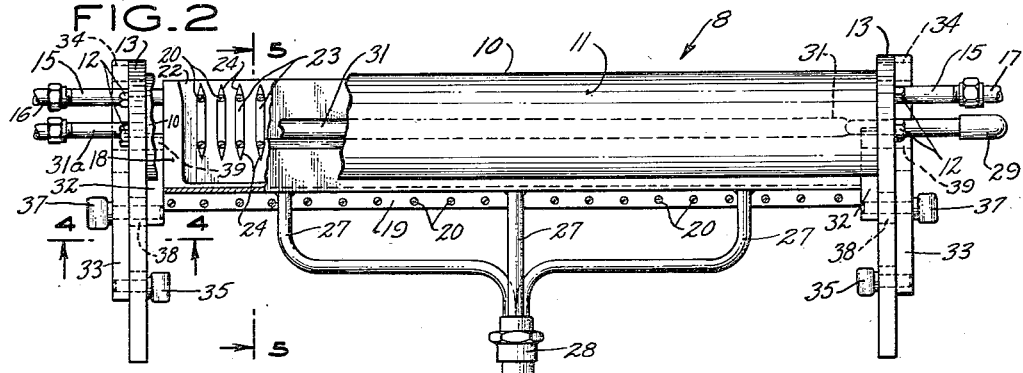
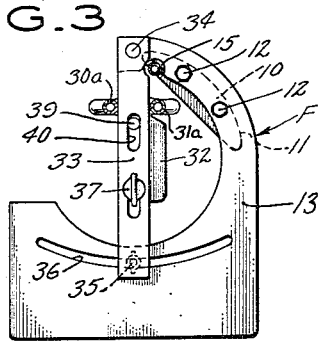
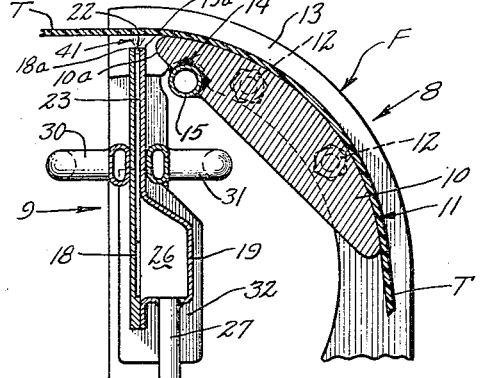
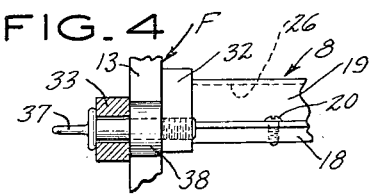
INVENTOR
SERGE A. LOUKOMSKY
BY Bates + Willard
ATTORNEYS United States Patent Office 2,767,103
Patented Oct. 16, 1956

2,767,103

METHOD AND APPARATUS FOR TREATMENT OF POLYETHYLENE

Serge A. Loukomsky, Hartford, Conn., assignor to Plax Corporation, West Hartford, Conn., a corporation of Delaware Application April 30, 1954, Serial No. 426,809

6 Claims. (Cl. 117—46)

This invention relates to the modification of polyethylene articles, and more particularly to the oxidation of the surfaces of such articles, so that inks, cements, adhesives and the like adhere more readily and more firmly than to untreated surfaces.

Difficulty has been experienced in cementing polyethylene products and in printing thereon, the normally hydrophobic surfaces of polyethylene being unreceptive to most glues, adhesives and printing inks and dyes.

Heretofore, polyethylene surfaces have been made hydrophilic and adaptable to cementing and printing by oxidation. The surface may be prepared by passing it through a bath of an oxidizing solution, such as sulphuric acid-dichromate, and then washing in water and drying.

Exposures to an oxidizing flame and to high temperature oxidizing gases also have proved successful. However, in the case of polyethylene sheet, tubing and similar thin film products, the problem of obtaining a flame treatment sufficiently intense to modify the surface is complicated by the difficulty of preventing destruction of the film.

Proposed solutions to the problem have included supporting the sheet on rollers which are internally cooled, or on porous rolls, through which a cooling liquid is supplied into cooling contact with the film, the opposite surface of which is concurrently flamed. In the case of extruded film, the sheet may be fed directly from the die to the rollers and laid down uniformly thereon for flaming while still hot.

Generally, short-term heating at the high temperature presented by direct contact with or close proximity to a flame is preferable to heating for a longer time at lower temperatures.

Heretofore, it has been customary to move a polyethylene surface which is to be treated past or through hot air or flames from stationary burners or jets. When integrated with production of film or the like, the rate of production constituted a limitation on the speed with which the film moved past the stationary heater. Moreover, even though treatment be independent of extrusion, high speed film travel requires expensive handling machinery to maintain proper spacing from the burner and to prevent stretching and tearing. Consequently, it has been difficult to obtain the desirably short exposure to intense oxidizing heat.

Therefore, it is an object of the present invention to provide improved methods and means for treating polyethylene film with an oxidizing flame or high temperature gas.

Having in view the above and other objects which will be more apparent hereinafter, the invention consists in the novel methods, construction, arrangement and combination of elements and parts set forth in the appended claims, an illustrative embodiment of the invention is described in the following specification with reference to the accompanying drawings, in which:

Figure 1 is a side elevation view, partly schematic, of apparatus forming an illustrative embodiment of the invention for treating collapsed tubing;

Fig. 2 is an enlarged view of one of two burner nozzle assemblies shown in Fig. 1;

Fig. 3 is a front elevation view of the burner nozzle shown in Fig. 2;

Fig. 4 is an enlarged cross-sectional view taken on line 4—4 of Fig. 2; and

Fig. 5 is an enlarged cross-sectional view taken on line 5—5 of Fig. 2.

Referring to Fig. 1 of the drawings, there is there shown collapsed polyethylene tubing T which is fed from a suitable source, such as a supply roll 1 over a series of guide rollers 2, 3, 4, 5 and 6 and thereafter to a roll 7 on which the collapsed tubing 6 is progressively wound in well known manner.

The rollers 2—6 are mounted for rotation in suitable bearings (not shown) secured to a frame F or other conventional supporting structure.

In accordance with the present invention, equipment generally designated 8 is provided for effecting very short exposure of the collapsed tubing T to the intense oxidizing heat of burners or nozzles generally designated 9.

As shown in Fig. 1, the equipment 8 for treating one side of the collapsed tubing T is between the rollers 2 and 3 and is duplicated between the rollers 4 and 5 for treating the other side of the collapsed tubing.

Referring more particularly to the treating apparatus 8, there is provided a circularly arcuate shoe 10 over the curved surface 11 of which the tubing T is drawn from the roller 2 to the roller 3.

As shown in Figs. 2 and 3, the shoe 10 is secured at its ends by bolts 12 to spaced vertical frame plates 13. Adjacent the trailing edge 10a, the shoe 10 has a transverse groove 14 in which a tube 15 is brazed or otherwise secured in good heat transfer relationship. Inlet and outlet ends of the tube 15 are connected to supply and exhaust lines 16 and 17 for cooling fluid to control the temperature of the shoe 10.

As shown in the drawings, the nozzle 9 of each flaming unit 8 is adjustably mounted on the frame members 13. More particularly, each nozzle 9 includes a pair of plates 18 and 19 which are secured in face-to-face relationship by numerous screws 20. The contiguous straight upper edges 18a and 19a, respectively, of the plates define an elongate burner nozzle orifice 22 which is disposed transversely of the path of travel of the tubing T throughout its entire width adjacent the lip or edge 10a from which the tubing T leaves the shoe 10.

As shown in the drawings, ribs 23 project inwardly from the plate 18 at regular spaced intervals and are held in engagement with the plate 19 by two rows of the screws 20 so that the orifice 22 has a selected width throughout the entire length of the nozzle 9.

As shown in Figs. 2 and 5, the ribs 23 are disposed generally at right angles to the nozzle lips or edges 18a and 19a and have tapered ends 24 so as to offer substantially negligible resistance to flow of combustibles through the nozzle 9 and out of the orifice 22.

The adjacent side and rear edges of the plates 18 and 19 are firmly secured together in leak-proof engagement by the screws 20 so that discharge of combustibles is limited to the nozzle orifice 22.

The combustibles may be supplied from any suitable source (not shown) to the burner 9 as a mixture of gaseous fuel and air, the oxygen content of which preferably is enriched to increase the heat and oxidizing character of the flame produced at the orifice 22. The combustibles are introduced into the rear of the nozzle 9 and before discharging from the orifice 22 pass through a manifold chamber 26 which extends the length of the nozzle and is formed by the plate 18 and a drawn concavity in the plate 19.

Preferably, the combustible mixture is introduced through spaced supply inlets, the illustrated nozzle 9 having three such supply openings to which three supply tubes 27 conduct the combustibles through a coupling 28 from a regulable supply (not shown).

Preferably the nozzle 9, as well as the shoe 10, is provided with suitable cooling means with which to regulate the temperature and prevent overheating of the blades 18 and 19. In the illustrated embodiment, metal tubes 30 and 31 are brazed or otherwise secured in good heat exchanging relationship to the blades 18 and 19, respectively. The tubes 30 and 31 extend the length of the nozzle 9 and adjacent ends are connected by a hose coupling 29. Cooling liquid introduced into tube end 30a is exhausted through the adjacent end 31a at a regulable rate controlled by valve means (not shown).

As shown in Figs. 2 and 3, the nozzle 9 includes end members 32 which are brazed or otherwise firmly secured to the ends of the blades 18 and 19. The nozzle 9 is adjustably supported by the end members 32 to the mounting plates 13 of the frame F by suitable adjustment means which include adjustment bars 33 that are pivotally secured at their upper ends by pins 34 to the top center of the mounting plates 13. The lower ends of the adjustment bars 33 are secured to their respective plates 13 by thumb screws 35 which extend through arcuately slotted apertures 36 and provide for angularly adjusting the bars 33 and the nozzle 9 on the pins 34.

The elevation of the nozzle 9 relative to the adjustment bars 33 may be adjusted by means of thumb screws 37 which extend through longitudinal slots in the bars 33 and through spacers 38 into threaded engagement with the end members 32. Pins 39 secured in the members 32 extend outwardly through upper longitudinal slots 40 in the bars 33 to restrain the nozzle 9 against transverse movement relative to the bars 33.

It will be seen that the nozzle may be adjusted angularly and vertically relative to the shoe 10 so that the nozzle orifice 22 is at a selected distance from and directs a flame at a desired angle against the tubing T leaving the lip 10a of the shoe 10.

Generally, it has been found highly desirable to locate the nozzle 9 close to the shoe lip from which the tubing T leaves the shoe 10 so that there is little or no space between the shoe 10 and the adjacent blade of the nozzle.

The operation of the apparatus will be generally apparent from the preceding description. The tubing T is led from the supply roll 1 or other source by the guide roller 2 over the first shoe 10 from the lip 10a of which the tubing is led through flame 41 to the roller 3. The close proximity of the burner 9 to the shoe lip 10a assures extremely accurate spacing of the film from the nozzle orifice 22 while maintaining unengaged the portion exposed to the flame 41. Moreover, the closeness of the nozzle 9 to the shoe 10 substantially prevents aspiration of air therebetween despite the rapid movement of the tubing T from the shoe so that no current of air is drawn between the tubing and the flame. Rather a partial vacuum is created between the shoe lip 10a and the tubing which assures that the flame is there directed into contact with the tubing T and effects a thorough intense but only momentary heat treatment thereof.

The flame 41 of course is adjusted for intensity and oxygen in well known manner for maximum improvement in the adherence property of the polyethylene film without distortion.

From the roller 3 the tubing T is led over the reversing roller 4 to the second of the shoes 10 from the lip 10a of which the treated tubing is wound in conventional manner.

While the invention has been described with reference to collapsed tubing it will be understood that it is applicable to film and sheeting generally, and may be supplied directly from production equipment rather than subsequently as from the illustrated supply roll 1.

It will be appreciated that the present invention has the advantages of contact flaming moving polyethylene sheet while preventing entrainment of air by the moving sheet and of flaming sheet which is unsupported by roller or other means at the point of flame contact.

The sheet is drawn over a water cooled shoe and lip and immediately thereafter engaged only by a short flame which preferably is enriched by oxygen and has the advantage of positive flame contact and economy of fuel and oxygen.

It will be apparent to those skilled in the art that the novel principles of the invention disclosed herein in connection with an illustrative embodiment thereof will suggest various modifications and additional applications.

It is accordingly desired that in construing the breadth of the appended claims, they shall not be limited to the specific exemplifications of the invention described herein.

Having thus described the invention, what I claim as new and desire to be secured by Letters Patent, is as follows:

1. Apparatus for flaming the surface of polyethylene film comprising a liquid-cooled member having a supporting surface, means for drawing the film continuously over said surface in sliding engagement therewith, a burner nozzle transversely disposed relative to the movement of said film over said surface for directing flame against the surface of the moving film adjacent the lip or edge of the supporting member from which the film leaves the member, and means for supplying and removing cooling liquid to and from said supporting member to cool the supporting surface and lip of the member.

2. Apparatus as recited in claim 1 and wherein the burner is so located relative to the supporting member that the flame is directed against the film surface engaged by the supporting member immediately after the film surface leaves the liquid-cooled lip.

3. Apparatus as recited in claim 2 wherein said supporting member has a convex supporting surface and including liquid cooling means for cooling the burner nozzle.

4. Apparatus as recited in claim 2 and including a second supporting member and burner nozzle arranged to support and flame another surface of said film.

5. The process for making the surface of a polyethylene film more receptive to adhesives, inks and the like, wherein the film is drawn over a liquid-cooled supporting member in sliding surface engagement therewith, creating a partial vacuum on the surface of the film immediately as the surface slidably disengages the supporting member, and directing a flame on said surface in said partial vacuum adjacent said point of disengagement.

6. The process recited in claim 5, and wherein the film at the point of contact with the flame is supported in the air out of contact other than with the flame and the air.

References Cited in the file of this patent
UNITED STATES PATENTS

| Number | Name | Date |
|---|---|---|
| 2,381,942 | Wickmire | Aug. 14, 1945 |
| 2,632,921 | Kreidl | Mar. 31, 1953 |
| 2,648,097 | Kritchener | Aug. 11, 1953 |
| 2,683,894 | Kritchener | July 20, 1954 |